US009269056B2

(12) United States Patent
Padullaparthi et al.

(10) Patent No.: US 9,269,056 B2
(45) Date of Patent: Feb. 23, 2016

(54) METHOD AND SYSTEM FOR ADAPTIVE FORECAST OF WIND RESOURCES

(71) Applicant: Tata Consultancy Services Limited, Mumbai, Maharashtra (IN)

(72) Inventors: Venkata Ramakrishna Padullaparthi, Tamil Nadu (ID); Kurandwad Sagar, Tamil Nadu (IN); Geetha Thiagarajan, Tamil Nadu (IN); Anand Sivasubramaniam, Tamil Nadu (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 274 days.

(21) Appl. No.: 13/944,532

(22) Filed: Jul. 17, 2013

(65) Prior Publication Data

US 2014/0025354 A1    Jan. 23, 2014

(30) Foreign Application Priority Data

Jul. 20, 2012    (IN) .......................... 2092/MUM/2012

(51) Int. Cl.
*G06F 15/18* (2006.01)
*G06N 99/00* (2010.01)
*G06Q 10/00* (2012.01)

(52) U.S. Cl.
CPC .............. *G06N 99/005* (2013.01); *G06Q 10/00* (2013.01)

(58) Field of Classification Search
None
See application file for complete search history.

(56) References Cited

U.S. PATENT DOCUMENTS

| 6,269,351 | B1 | 7/2001 | Black |
| 7,228,235 | B2 | 6/2007 | Grzych et al. |
| 2011/0087627 | A1 | 4/2011 | Schmid et al. |
| 2012/0083933 | A1 | 4/2012 | Subbu et al. |
| 2013/0146587 | A1* | 6/2013 | McDonald .................... 219/494 |

OTHER PUBLICATIONS

Barrios et al. "Multiple Model Framework of Adaptive Extended Kalman Filtering for Predicting Vehicle Location", IEEE ITSC 2006, pp. 1053-1059.*
"The Kalman filter", 2006, 28 pages, http://stanford.edu/class/ee363/lectures/kf.pdf.*
P. Pinson et al., "Wind Power Forecasting using Fuzzy Neural Networks Enhanced with On-line Prediction Risk Assessment," 2003 IEEE Bologna PowerTech Conference, Jun. 23-26, Bologna, Italy, 8 pgs.

(Continued)

*Primary Examiner* — Li-Wu Chang
(74) *Attorney, Agent, or Firm* — Ditthavong & Steiner, P.C.

(57) ABSTRACT

A method and system are provided for determining at least one combined forecast value of non-conventional energy resources. An Input/output Interface receives an adaptively selected historical dataset and a current dataset from one or more predictive forecast models and/or measurements. An adaptive forecast module generates one or more variants of machine learning models to model the performance of the one or more predictive forecast models by training the one or more variants of machine learning models on the historical dataset. The adaptive forecast module correlates the current dataset with the historical dataset to adaptively obtain a filtered historical dataset. The adaptive forecast module evaluates the one or more variants of machine learning models on the filtered historical dataset. The adaptive forecast module derives a statistical model to determine the at least one combined forecast value by combining outputs obtained based on the evaluation.

9 Claims, 5 Drawing Sheets

(56) References Cited

OTHER PUBLICATIONS

"Neural Networks Used to Improve Wind Speed Forecasting," pp. 1-3, http://www.sciencedaily.com/releases/2009/04/090430081233.htm.

A. More et al., "Forecasting wind with neural networks," Civil Engineering, Indian Institute of Technology, Mumbai 400076, India, 15 pgs, Jun. 10, 2015.

* cited by examiner

METHOD AND SYSTEM FOR ADAPTIVE FORECAST OF WIND RESOURCES

TECHNICAL FIELD

The present disclosure generally relates to data forecasting systems. The present disclosure is particularly applicable to data forecasting systems for forecasting non-conventional energy resources using machine learning mechanisms.

BACKGROUND

The depletion of conventional energy has resulted in utilization of non-conventional energy resources, such as wind, sunlight, tides, geothermal heat, etc. for generating energy and power. The renewable energy generated from these natural resources plays a significant role in meeting the energy requirements for constantly growing sectors in the global economy.

There has been tremendous growth in the utilization of wind energy for generating power in recent times. Market analysis at the end of 2011 indicates that wind power is growing at over 20% annually, with a worldwide installed capacity of 238,000 megawatts (MW), primarily in continents such as Europe, Asia, and the North America. Considering the impact of wind resources in the power market for delivering quality and sufficient quantity output, accurate forecast of wind resources is essential.

There have been several attempts made in the past for accurate forecast of wind resources. Several forecasting tools exists in the art that enable forecasting of wind resources based on different assumptions and concepts resulting in multiple alternate forecasts. Further, attempts have been made to combine these several alternate forecasts into a single forecast of superior accuracy using various statistical and machine learning methods.

One such method includes classifying, normalizing and grouping historic wind patterns and associating each group with an energy output that the wind farm produces using neural network and Bayesian logic. The method uses turbine specific data, met mast data and regional forecast information from external forecasting services to adaptively adjust its logic and update current wind patterns. The wind resource is forecast based on a match obtained from an historical database relating the updated wind pattern to wind farm energy and use of actual measured energy and turbine specific data. However, this method is limited to using only regional forecast information and ignoring turbine level forecasts. Further, performance of a neural network changes with change in parameters governing the network; and hence use of a single neural network may not cover the entire parameter space.

Another method that enables wind resource forecasting is implemented using two sub-systems. A wind forecasting sub-system of this method adaptively combines wide area wind forecast signals, alternate meteorological data sources and SCADA based inputs to produce a refined wide area wind forecast signal. This then acts as the input to another subsystem termed wind farm production forecasting, that uses turbine specific transfer functions and power curves to convert wide area wind forecast signals to turbine specific wind forecast signals and energy forecasts, respectively, that is further refined based on SCADA inputs. However, the adaptive statistics module employed by this method uses regional forecast information and ignores turbine specific forecasts.

Another technique for estimating wind resource forecasts utilizes an NWP model. The NWP model, in addition to receipt of wide area regional forecast as input, adjusts and calibrates its forecast based on turbine level measurements. However, the NWP model may not work well for short term forecasts. Further, the NWP model receives a single forecasting service as input and hence does not combine several forecasts. In addition, this technique is limited to application of physical models only.

A method to improve the accuracy of the NWP model for short term forecasting generates multiple forecasts from a single model by using slightly different initial conditions (and/or boundary conditions), which are later combined to give an ensemble forecast. However, this method uses a single NWP model; the input/runtime boundary conditions are perturbed to generate multiple results. Accuracy is hence bounded by the model's performance. Further, ensemble techniques currently used are mostly mathematical and hence do not involve any machine learning approach.

Another approach involves adaptively combining alternate forecasts by means of two methods: (1) linearly combining them with appropriate weights assigned; and (2) exponentially weighing and tracking the best predictor. The approach further involves selection of the best forecasts using exponential weighing. However, the weighing method has inherent limitations in that it fails to adapt to changes, especially when the best predictor constantly changes.

A need therefore exists for a method and system that enable adaptive forecasting of wind resources by combining several alternate forecasts and achieving maximized forecast accuracy. More particularly, there is a need in the art to converge on a most efficient method of combining that is independent of the nature of the predictors, whose forecasts are to be combined, applicable universally, not limited to a specific location, and able to function over a range of forecast time horizons.

A need also exists for a method and system that enable use of alternate forecasts at turbine level. Further, there is a need for a method and system that enable wind resources forecasting by creating variants of artificial neural networks that covers the entire parameter space rather than relying on a single neural network.

SUMMARY

This summary is provided to introduce aspects related to systems and methods for determining at least one combined forecast value of non-conventional energy resources and aspects thereof are further elaborated below in the detailed description. This summary is not intended to identify essential features of the claimed subject matter, nor is it intended for use in determining or limiting the scope of the claimed subject matter.

An aspect of the present disclosure is a method for determining at least one combined forecast value of non-conventional energy resources by combining one or more forecast values received from one or more predictive forecast models is disclosed. The method comprises a plurality of steps that are performed by a processor using computer-readable instructions stored in the memory. The steps performed by the processor comprise: adaptively selecting a historical dataset comprising a first set of forecast values and a first set of actual values received from the one or more predictive forecast models and/or one or more measurements; dynamically generating one or more sufficiently large number of variants of machine learning models to model the performance of the one or more predictive forecast models by training the one or more variants of machine learning models on the selected historical dataset; receiving in real time a current dataset comprising a second set of forecast values and a second set of actual values from the one or more predictive forecast models; correlating the current dataset with the historical dataset to adaptively obtain a filtered historical dataset; evaluating the one or more trained variants of machine learning models on the filtered historical dataset; and deriving a statistical model to determine at least one combined forecast value by combining the outputs of the one or more trained variants of machine learning models based on the evaluation of the one or more trained variants of machine learning models on the filtered historical dataset.

Another aspect of the present disclosure is a system for determining at least one combined forecast value of non-conventional energy resources by combining one or more forecast values received from one or more predictive forecast models is disclosed. The system comprises a processor, an Input/Output (I/O) interface and a memory coupled to the processor for operating a plurality of modules present in the memory. The plurality of modules comprises an adaptive forecast module. The Input/output (I/O) interface is configured to read an adaptively selected historical dataset and a current dataset received from the one or more predictive forecast models and/or measurements. The adaptive forecast module is configured to adaptively select the historical dataset comprising a first set of forecast values and a first set of actual values received from the one or more predictive forecast models and/or one or more measurements. Further, the adaptive forecast module is configured to dynamically generate one or more sufficiently large number of variants of machine learning models to model the performance of the one or more predictive forecast models by training the one or more variants of machine learning models on the historical dataset. The adaptive forecast module is adapted to receive in real time a current dataset comprising a second set of forecast values and a second set of actual values from the one or more predictive forecast models. The adaptive forecast module is further configured to correlate the current dataset with the historical dataset to adaptively obtain a filtered historical dataset. The adaptive forecast module is further configured to evaluate the one or more trained variants of machine learning models on the filtered historical dataset. Finally, the adaptive forecast module is configured to derive a statistical model that determines the at least one combined forecast value by combining the outputs of the one or more trained variants of machine learning models based on the evaluation of the one or more trained variants of machine learning models on the filtered historical dataset.

In another aspect of the present disclosure a computer program product having embodied thereon a computer program for determining at least one combined forecast value of non-conventional energy resources by combining one or more forecast values received from one or more predictive forecast models is disclosed. The computer program product comprises a program code for adaptively selecting a historical dataset comprising a first set of forecast values and a first set of actual values received from the one or more predictive forecast models and/or one or more measurements. The computer program code further comprises a program code for dynamically generating one or more sufficiently large number of variants of machine learning models to model the performance of the one or more predictive forecast models by training the one or more variants of machine learning models on the selected historical dataset. The computer program code further comprises a program code for receiving in real time a current dataset comprising a second set of forecast values and a second set of actual values from the one or more predictive forecast models. The computer program code further comprises a program code for correlating the current dataset with the historical dataset to adaptively obtain a filtered historical dataset. The computer program code further comprises a program code for evaluating the one or more trained variants of machine learning models on the filtered historical dataset. The computer program code further comprises a program code for deriving a statistical model to determine at least one combined forecast value by combining the outputs of the one or more trained variants of machine learning models based on the evaluation of the one or more trained variants of machine learning models on the filtered historical dataset.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

Figure 1:
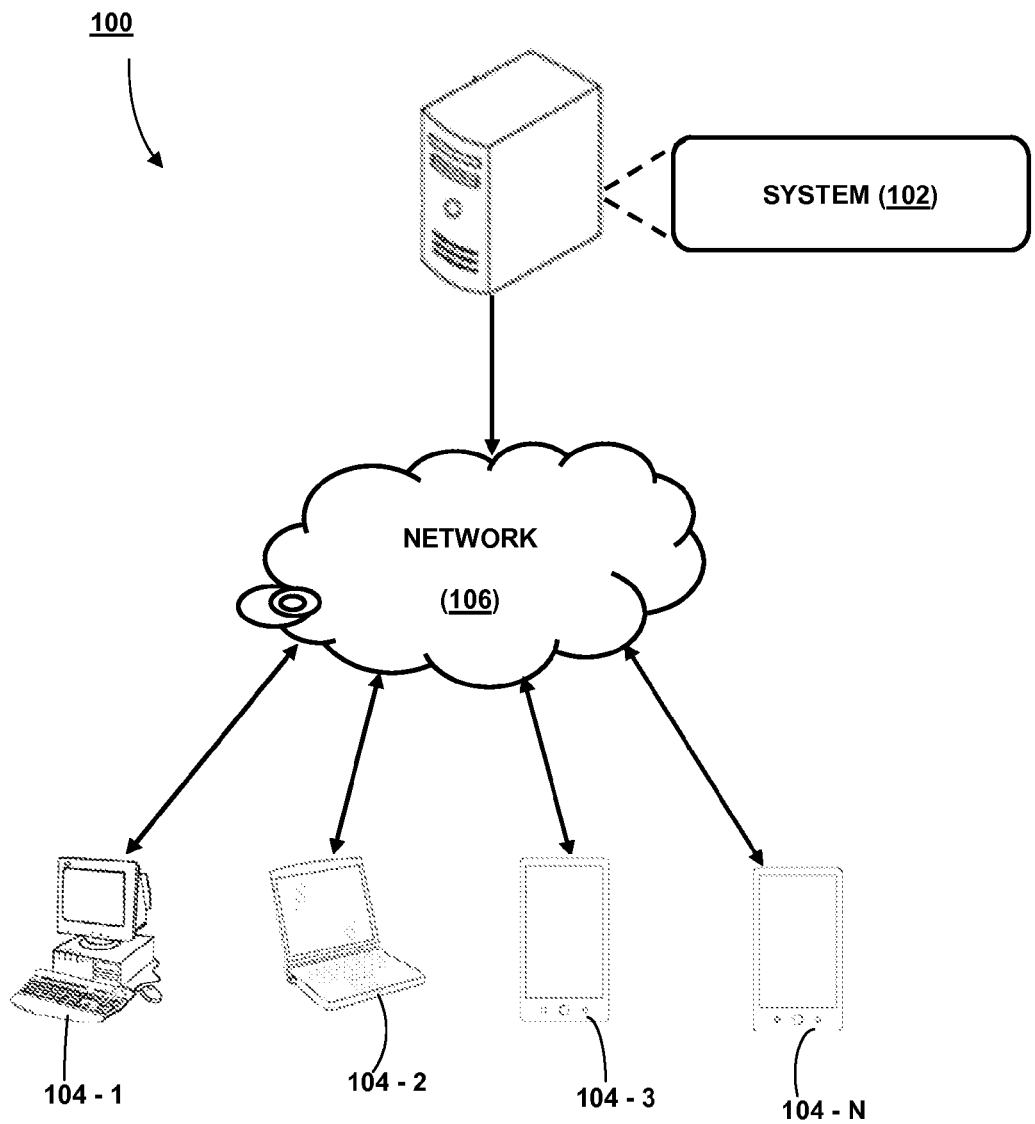
FIG. 1 illustrates a network system for determining at least one combined forecast value of non-conventional energy resources, in accordance with an aspect of the present disclosure.

Systems and methods for determining at least one combined forecast value of non-conventional energy resources are described. The present disclosure addresses and solves conventional limitations by providing an effective and efficient mechanism for determining the at least one combined forecast value by combining a plurality of forecast values received from one or more predictive forecast models. The combined forecast value is determined based on machine learning techniques in combination with an Adaptive boosting (Adaboost) approach.

In order to determine the at least one combined forecast value, at first, an historical dataset and a current dataset each comprising forecast values and actual values for the one or more predictive forecast models are received. Subsequent to the receipt of the historical dataset and the current dataset, one or more variants of machine learning models are dynamically generated to model the performance of the one or more predictive forecast models. The one or more variants of machine learning models can be generated using known ensemble techniques. In the process of dynamically generating the one or more sufficiently large number of variants of machine learning models, the one or more variants of the machine learning models are trained on the historical dataset.

Further, the historical dataset is correlated with the current dataset to adaptively obtain a filtered historical dataset. The one or more trained variants of the machine learning models are then evaluated using the filtered historical dataset to obtain one or more outputs of the one or more trained variants of the machine learning models. The one or more outputs are suggestive of one or more weights to be assigned to the one or more trained variants of the machine learning models and the outputs of the one or more trained variants of the machine learning models. Thus, the machine learning models are used to model the performance of the one or more predictive forecast models by comparing the forecasts values with the corresponding actual values over the historical dataset or evaluating the forecast errors of the one or more predictive forecast models over the historical dataset.

Thereafter, a statistical model is derived by adaptively assigning the one or more weights to each of the one or more trained variants of machine learning models and the outputs of the one or more trained variants of machine learning models. The statistical model represents an optimal combination function that is utilized for determining the at least one combined forecast value. The optimal combination function determines the combined forecast value by combining the outputs of the one or more trained variants of the machine learning models using the one or more weights obtained during evaluation of the one or more variants of machine learning models. Thus, the systems and methods of the present invention enable converging on the most efficient and effective combined forecast values by adaptively combining the one or more forecast values obtained through the one or more predictive forecast models.

While aspects of described system and method for determining at least one combined forecast value of non-conventional energy resources may be implemented in any number of different computing systems, environments, and/or configurations, the embodiments are described in the context of the following exemplary system.

Referring now to FIG. 1, a network 100 of a system 102 for determining at least one combined forecast value of non-conventional energy resources is illustrated, in accordance with an aspect of the present disclosure. In one embodiment, the system 102 enables receiving of a historical dataset comprising historical forecast values along with corresponding actual values and a current dataset comprising current forecast values along with corresponding actual values from one or more predictive forecast models. The system 102 dynamically generates one or more variants of machine learning models for modeling the performance of the one or more predictive forecast models by training the one or more variants of the machine learning models on the historical dataset. The system 102 may correlate the historical dataset with the current dataset to obtain a filtered historical dataset. The system 102 may then evaluate the trained one or more variants of the machine learning models using the filtered historical dataset. Based upon the evaluation, one or more outputs in the form of one or more weights may be obtained. The system 102 may then derive a statistical model representing an optimal combination function by adaptively assigning the one or more weights to the trained one or more variants of the machine learning models and/or the outputs of each of the trained one or more variants of the machine learning models. The system 102 may determine the combined forecast value using an optimal combination function, wherein the optimal combination function adaptively combines the one or more weights assigned to the one or more trained variants of the machine learning models and the outputs of each of the trained one or more variants of the machine learning models.

Although the present disclosure is described considering that the system 102 is to be implemented on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
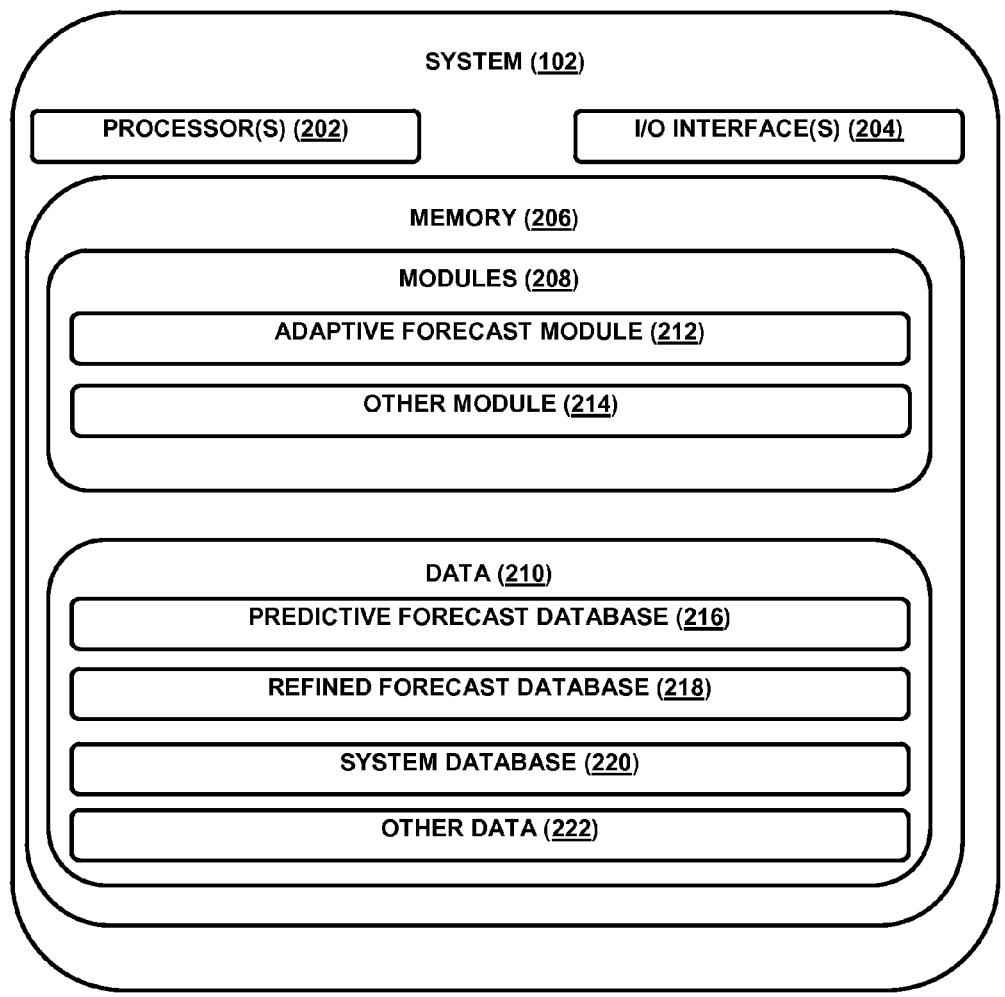
FIG. 2 illustrates a system in accordance with an aspect of the present disclosure.

Referring now to FIG. 2, the system 102 is illustrated in accordance with an aspect of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an adaptive forecast module 212 and other modules 214. The other modules 214 may include programs or coded instructions that supplement applications and functions of the system 102.

The data 210, amongst other things, serves as a repository for storing data processed, received, and generated by one or more of the modules 208. The data 210 may also include a predictive forecast database 216, a refined forecast database 218, a system database 220, and other data 222. The other data 222 may include data generated as a result of the execution of one or more modules in the other module 214.

In one implementation, at first, a user may use the user devices 104 to access the system 102 via the I/O interface 204. The user may register using the I/O interface 204 in order to use the system 102. The working of the system 102 may be explained in detail in FIGS. 3 and 4 explained below.

Figure 3:
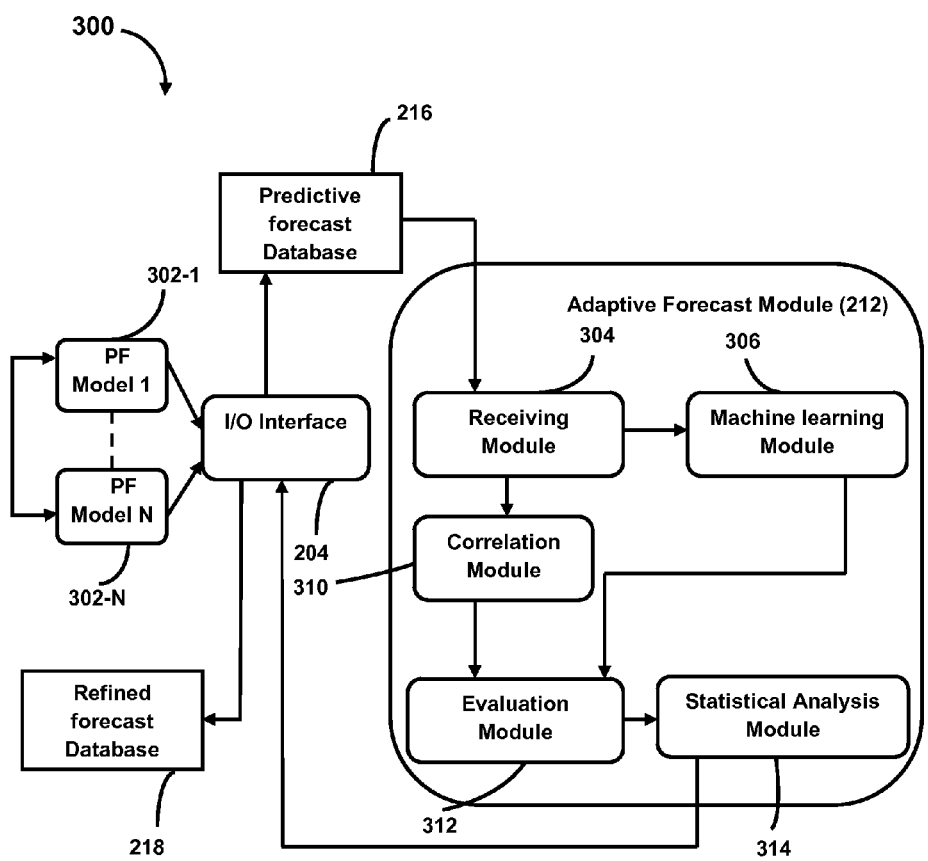
FIG. 3 illustrates a method for determining at least one combined forecast value of non-conventional energy resources, in accordance with an aspect of the present disclosure.

Referring to FIG. 3, a detailed working description of the adaptive forecast module 212 along with the operation of other components of the system 102 is illustrated, in accordance with an aspect of the present disclosure. In one embodiment, in order to determine the at least one combined forecast value, a plurality of forecast values and corresponding actual values are read by the I/O Interface 204 from a plurality of predictive forecast models 302-1, 302-2 . . . 302-N. In one embodiment, the plurality of predictive forecast models 302-1, 302-2 . . . 302-N comprise a supervisory control and data acquisition (SCADA) model, a physical model such as a numerical weather prediction model, a statistical model, a machine learning model, and an alternate forecast model, etc. The plurality of forecast values and the corresponding actual values are stored in the predictive forecast database 216. The predictive forecast database 216 is adapted to store a historical dataset comprising the plurality of forecast values and the corresponding actual values historically received from the plurality of predictive forecast models 302-1, 302-2 . . . 302-N. Further, the predictive forecast database 216 is adapted to store a current dataset and an historical dataset comprising the plurality of forecast values and the corresponding actual values received from the plurality of predictive forecast models 302-1, 302-2 . . . 302-N in real time.

In one embodiment, the adaptive forecast module 212 may receive the historical dataset and the current dataset stored in the predictive forecast database 216 using a receiving module 304. A machine learning module 306 is configured for generation of one or more variants of machine learning models to model the performance of the plurality of predictive forecast models 302-1, 302-2 . . . 302-N. In one embodiment, the one or more variants of machine learning models which are generated comprise Artificial Neural Networks (ANNs), basis function models, kernel methods, support vector machines, decision trees, variation methods, distribution sampling methods, ensemble methods, graphical models, and search methods, etc. for mining records. The one or more variants of machine learning models are generated using ensemble techniques comprising bagging, boosting, adaptive boosting (AdaBoost), stack generalization, Bayesian model combination, clustering methods, tree based models, and conditional mixture models, etc. In a preferred embodiment, the one or more variants are generated using the AdaBoost technique.

Further, the machine learning module 306 is configured for training the one or more variants of machine learning models on the historical dataset received. The one or more variants of the machine learning models are trained using the AdaBoost technique. A set of training data points from the historical dataset is introduced and assigned equal weights. The starting values of the model parameters are initialized. On the entire set of training data points, a machine learning model in the form of variant 1 (also referred as Model 1) is fitted. All the training data points within a certain Euclidean distance from this model are modeled by Model 1. Further, the data points modeled by Model 1 are removed, and the remaining data points are re-weighed with respect to their Euclidean distance from Model 1 with the points farther from Model 1 gaining more weight, and vice versa. The new re-weighted training set containing the data points that were un-modeled by Model 1 is used for training another model called variant 2 or Model 2. All the data points modeled by Model 2 are removed from the re-weighted data set and the rest of the data points are weighed with respect to their Euclidean distance from Model 2. This process continues till all the data points in the set of training data points are modeled by one or the other model variants. Thus, the one or more variants of machine learning models are generated and trained for the plurality of predictive forecast models 302-1, 302-2 . . . 302-N.

In one embodiment, a correlation module 310 is utilized to correlate the historical dataset with the current dataset to adaptively obtain a filtered historical dataset. The correlation module 310 is configured for correlating the current forecast value with the historical forecast value. Such correlation results in obtaining a filtered historical dataset. wherein the filtered historical dataset comprises the historical forecast values highly correlated to the current forecast value, along with their corresponding historical actual values. The filtered historical dataset is then inputted to an evaluation module 312. Further, the evaluation module 312 is configured to evaluate the performance of the one or more variants of machine learning models trained over the adaptively obtained filtered dataset. The evaluation module is configured to adaptively assign weights to each of the trained variants of machine learning models and to their output values.

Subsequent to adaptive assignment of weights to each of the trained variants of machine learning models, a statistical analysis module 314 is configured to derive a statistical model for adaptively combining the weights assigned to each of the trained variants of machine learning models and their outputs. In an embodiment, the statistical model represents an optimal combination function that is responsible for adaptively combining the weights assigned to each of the trained variants of machine learning models and their outputs. The optimal combination function based on the combination of weights results in obtaining the at least one combined forecast value for the one or more predictive forecast models 302-1, 302-2 . . . 302-N. Thus, the output of the statistical analysis module 314 is the at least one combined forecast value for the one or more predictive forecast models 302-1, 302-2 . . . 302-N. The I/O interface 204 is configured to write the at least one combined forecast value in the refined forecast database 218 for future use. Since the one or more trained variants of machine learning models and their output values are adaptively combined, the at least one forecast value represents an accurate forecast value for the one or more predictive forecast models 302-1, 302-2 . . . 302-N.

In one exemplary embodiment, the at least one combined forecast value can be obtained using AdaBoost technique by implementing an alpha-beta-gamma ($\alpha\beta\gamma$) algorithm. In this embodiment, for example, consider a number k of readily available forecasts f1, f2, f3 . . . fk, of the random variable z, represented by a discrete time series { . . . $z_{t-5}$, $z_{t-4}$, $z_{t-3}$, $z_{t-2}$, $z_{t-1}$, $z_t$. The objective is to combine them into a single forecast fc such that fc is a better forecast than any of the readily available forecasts. The combination can be represented in the following format:

$$fc(z)=\phi(f1)(z),f2(z),f3(z)\ldots fk(z)) \quad (1)$$

where $\Phi$ is a non-linear function of the k forecasts $f_1$ to $f_k$. The non-linear relationship between the individual predictors can be justified in the following manner:

In this embodiment, assume that the information set used by the jth predictor for the ith individual forecast is given as {Iji: Ijci, Ijsi}, where Ijci is the common part of information used by all the k predictors and Ijsi is the special information for the ith forecast only. The combination model can be considered as a system that combines information processing sub-systems given as:

$$fc=f\phi(I1,I2,I3\ldots Ik) \quad (2)$$

The performance of the integrated system is more than just a linear sum of performances of individual subsystems and hence the non-linear relationship between individual forecasts and the actual time series represented by equation (1) is justified. It is generally difficult to determine the form of the non-linear relationship '$\phi$'. However, using data driven forecasting procedures using machine learning models, the non-linear relationship can be realized.

In this embodiment, the historical dataset and the current dataset is accepted from the Predictive forecast Database 216 by implementing four different statistical forecast algorithms. The time series data is first analyzed and forecasted using a Mycielski approach, Persistence, Modified Persistence, and Artificial Neural Network. The forecast values and the actual values of the time series are arranged as columns of a Data Matrix (DM), with columns 1 to 4 representing the forecast values and column 5 containing the actual values of the time series. In other embodiments, there may be other methods or ways of arranging the forecast values and the actual values other than the Data matrix (DM) method. In this embodiment, the Data matrix formed is as below:

$$\text{DATA MATRIX} = \begin{bmatrix} f1 & f2 & f3 & f4 & a \\ f11 & f21 & f31 & f41 & a1 \\ f12 & f22 & f32 & f42 & a2 \\ f13 & f23 & f33 & f43 & a3 \\ f14 & f24 & f34 & f44 & a4 \\ f15 & f25 & f35 & f45 & a5 \\ \vdots & \vdots & \vdots & \vdots & \vdots \\ f1n-1 & f2n-1 & f3n-1 & f4n-1 & an-1 \\ f1n & f2n & f3n & f4n & an \end{bmatrix}$$

Figure 4:
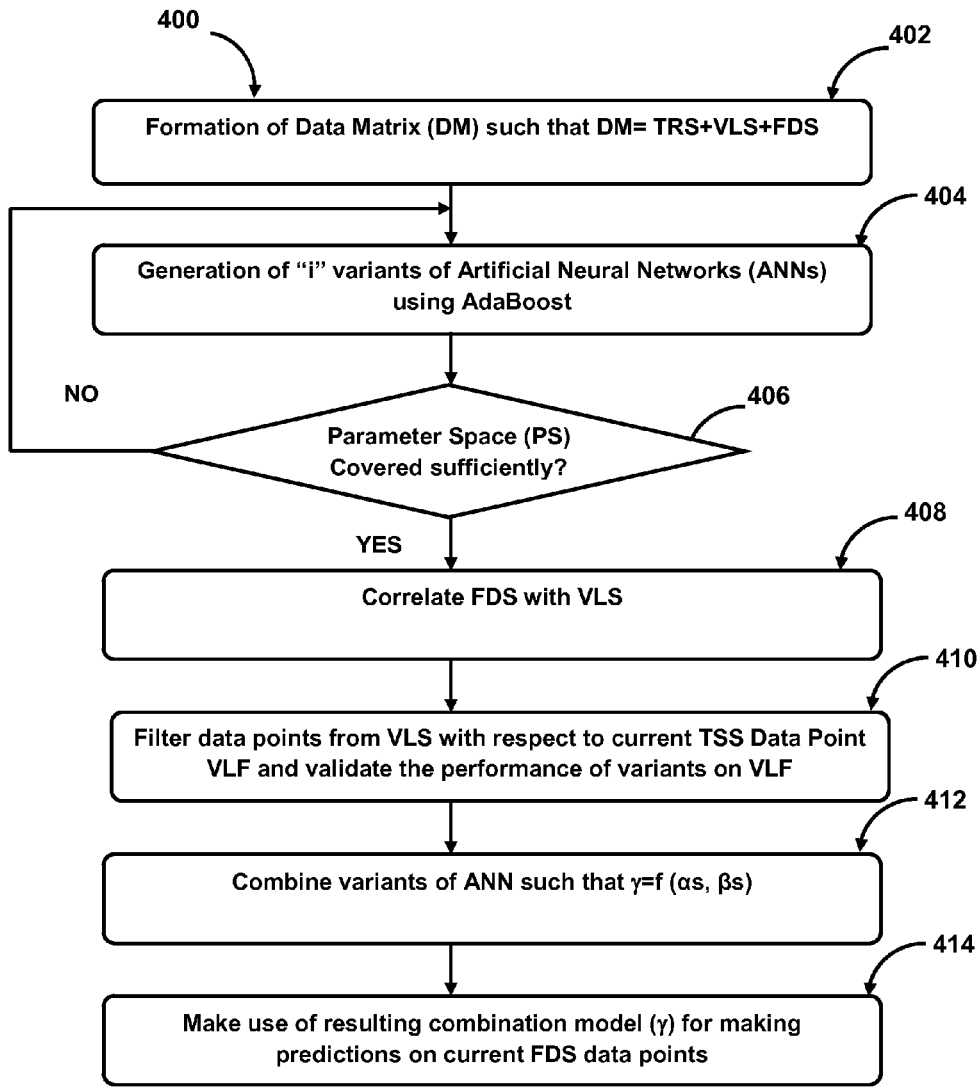
FIG. 4 is a flow diagram illustrating alpha-beta-gamma method of modeling for combining forecasts, in accordance with an aspect of the present disclosure.

Subsequent to the formation of the Data matrix, the alpha-beta-gamma ($\alpha\beta\gamma$) algorithm is used to map the values of the four forecasts in column 1 to column 4 of the data matrix to the actual values of wind speed in column 5, nonlinearly. The complexity of the artificial neural networks (ANN) variants is determined using a number of techniques such as trial and error, signal to noise ratio, ROC curves, etc. The variants of artificial neural networks are generated using various ensemble techniques such as bagging, boosting, adaptive boosting (AdaBoost), stack generalization, Bayesian model combination, clustering methods, tree based models and conditional mixture models etc. Preferably, adaptive boosting (AdaBoost) is utilized for generating the variants of artificial neural networks (ANN). Generally, the performance of Artificial Neural Networks (ANNs) changes with the change in internal parameters governing the network. Even with the same set of parameters, the ANN results might vary significantly. Hence creation of variants of ANNs is vital for each parameter set over a number of runs as well as across the entire Parameter Space (PS). Therefore, a novel modified version of the AdaBoost algorithm is utilized to accomplish the creation of ANN variants. This novel modification is necessary due to the notoriously varying nature of wind resources as well as the rapidly fluctuating performances of the individual forecasts. Since the data represents a time series, the ordered structure of Training Set (TRS), Validation Set (VLS) and Forecasting Set (FDS) are retained in the alpha-beta-gamma ($\alpha\beta\gamma$) algorithm. In this embodiment, the final model combines the forecasts by filtering the best possible combinations throughout the parameter space and recombining them to obtain a single better forecast for each time instance. FIG. 4 illustrates a flow diagram collectively describing the alpha-beta-gamma ($\alpha\beta\gamma$) algorithmic method of modeling to obtain a single forecast by combining one or more forecasts in one embodiment of the invention.

As illustrated, at step 402, the data matrix is formed by initialization of the training data set (TRS), the validation data set (VLS), and the forecasting data set (FDS)

At step 404, the variants of artificial neural networks (ANN) are generated using the AdaBoost algorithm by training on the training data set (TRS). In this embodiment, "i" variants of ANN are generated using the AdaBoost algorithm by training on the training data set (TRS). The training on the TRS is repeated for "j" times on the current parameter set (by varying the parameter values internal to the ANNs so that a number of variants with different ending points are generated). The variants generated are stored as data structure "$\alpha$" in the system database 220.

At step 406, it is verified whether the parameter space is covered sufficiently. If the parameter space is covered sufficiently, the method proceeds to step 408, or else the parameters are updated and the step 404 is re-executed.

At step 408 the forecast data set (FDS) and the validation set (VLS) are correlated.

At step 410, the data points from the validation data set (VLS) are filtered (VLF) with respect to the current FDS data points based on the correlations from step 408. Then the performance of ANN variants is validated on the current VLF data points. The performance values are stored in matrix "$\beta$" in the system database 220. In alternative embodiments, the performance values may be stored in data formats/types other than the matrix "$\beta$".

At step 412, the combination of ANN variants is implemented to obtain a resulting combination model '$\gamma$' in a manner such that $\gamma$=f ($\alpha$s, $\beta$s), wherein, $\beta$s represents a set of best performance values and $\alpha$s represents a set of best performing variants of ANN. The resulting combination model '$\gamma$' is then stored in the system database 220.

At step 414, the resulting combination model ($\gamma$) is utilized for making predictions based on the current FDS data points.

The execution of the '$\alpha\beta\gamma$' algorithm on the Data Matrix is experimentally tested to validate the performance of the '$\alpha\beta\gamma$' algorithm. The performance of '$\alpha\beta\gamma$' is compared with four individual forecasts in terms of Mean Absolute Error (MAE), Mean Absolute Percentage Error (MAPE) and R-square ($R^2$). The following table illustrates the result of comparison of performances of the four predictors and '$\alpha\beta\gamma$' over a forecast period of one year. The algorithm "$\alpha\beta\gamma$" is tested to predict wind speeds for 1 data point ahead, 24 data points ahead and 48 data points ahead forecast horizons.

|  | M | S | P | ANN | αβγ Forecast horizon 1 | αβγ Forecast horizon 24 | αβγ Forecast horizon 48 |
| --- | --- | --- | --- | --- | --- | --- | --- |
| MAPE | 17.98123 | 17.34337 | 20.82771 | 7.964045 | 5.621898 | 5.671842 | 5.723878 |
| R2 | 0.894285 | 0.889254 | 0.836484 | 0.989425 | 0.988417 | 0.987741 | 0.985565 |
| MAE | 0.6931 | 0.71497 | 0.8997 | 0.22 | 0.1798 | 0.1588 | 0.16894 |

It is observed from the table that the performance of 'αβγ' is independent of the forecast horizon. In addition, less complex ANNs performed better compared to ANNs with a greater number of hidden layers and a greater number of neurons in each layer. Hence, the processing time required for forecast over various windows is less or almost the same.

Figure 5:
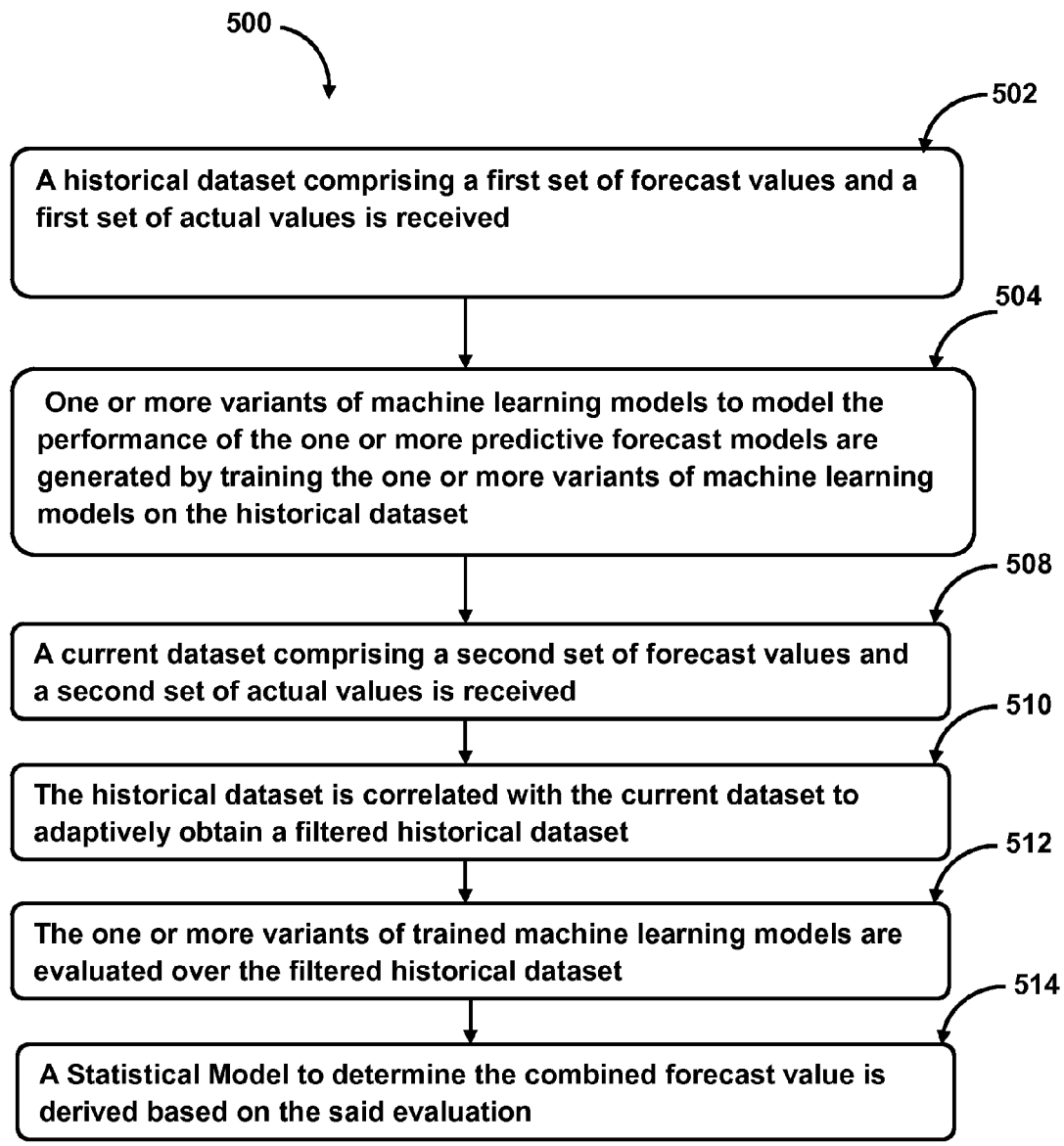
FIG. 5 illustrates a method in accordance with an aspect of the present disclosure.

Referring now to FIG. 5, a method 500 for determining at least one combined forecast value of non-conventional energy resources is shown, in accordance with an aspect of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as limitative, and any number of the described method blocks can be combined in any order to implement the method 500 or alternate methods. Additionally, individual blocks may be deleted from the method 500 without departing from the spirit and scope of the subject matter described herein. Furthermore, the method can be implemented with any suitable hardware, software, firmware, or combination thereof. However, for ease of explanation, in the embodiments described below, the method 500 may be considered to be implemented in the above described system 102.

At block 502, a historical dataset comprising a first set of forecast values and a first set of actual values is received. In one embodiment, the historical dataset may be received by the receiving module 304 of the Adaptive Forecast Module 212.

At block 504, one or more variants of machine learning models to model the performance of the one or more predictive forecast models are generated by training the one or more variants of machine learning models on the historical dataset. In one embodiment, the one or more variants of machine learning models may be generated and trained by the machine learning module 306 of the Adaptive Forecast Module 212.

At block 508, a current dataset comprising a second set of forecast values and a second set of actual values is received. In one embodiment, the current dataset may be received by the receiving module 304 of the Adaptive Forecast Module 212.

At block 510, the current dataset is correlated with the historical dataset in order to adaptively obtain a filtered historical dataset. In one embodiment, the current dataset and the historical dataset may be adaptively correlated by the correlation module 310 of the Adaptive Forecast Module 212 to obtain the filtered historical dataset.

At block 512, the trained one or more variants of machine learning models are evaluated over the filtered historical dataset in order to assign weights to each of the trained one or more variants of machine learning models and their outputs.

In one implementation, the trained one or more variants of machine learning models may be evaluated by the evaluation module 312 of the Adaptive Forecast Module 212.

At block 514, the output of the evaluation module 312, i.e. the weights assigned may be combined to derive a statistical model in form of an adaptive combination function. The adaptive combination function combines the weights assigned to each of the trained one or more variants of machine learning models and their outputs in order to obtain the at least one combined forecast value. In one implementation, the statistical model may be derived by the statistical analysis module 314 of the Adaptive Forecast Module 212.

ADVANTAGES OF THE PRESENT DISCLOSURE

The present disclosure enables combining one or more alternate forecasts that are independent of the nature of the predictors whose forecasts are to be combined.

The present disclosure enables generation of variants of neural networks that cover the entire parameter space and are trained on historical and real-time data set of alternate forecasts.

The present disclosure adopts an adaptive method for wind resources forecasting using advanced machine learning techniques that enables maximized forecast accuracy.

The optimal combination function can be re-established for every single forecast based on the observed alternate forecasts.

Although embodiments of methods and systems for determining at least one combined forecast value of non-conventional energy resources have been described in language specific to structural features and/or methods, it is to be understood that the appended claims are not necessarily limited to the specific features or methods described. Rather, the specific features and methods are disclosed as examples of implementations for determining at least one combined forecast value of non-conventional energy resources.

Aspects of the present disclosure include positioning the informed risk of predicting closer towards the sample rather than the mean of the predictive distribution. Thus, errors are minimized even more compared to other alternative forecast models and hence out performs them.

What is claimed is:

1. A method for determining at least one combined forecast value of non-conventional energy resources for enabling adaptive forecasting of the non-conventional energy resources, the method comprising:

selecting a historical dataset comprising a first set of forecast values received from one or more predictive forecast models and a first set of actual values received from one or more measurements of the non-conventional energy resources;

generating one or more variants of machine learning models to model performance of the one or more predictive forecast models by training the one or more variants of the machine learning models on the historical dataset;

receiving a current dataset comprising a second set of forecast values derived from the one or more predictive forecast models and a second set of actual values derived from the one or more measurements of the non-conventional energy resources;

correlating the current dataset with the historical dataset to adaptively obtain a filtered historical dataset;

selecting the one or more variants of the machine learning models trained on the historical dataset and evaluating them on the filtered historical dataset to assign weights to each of the one or more variants of the machine learning models and their outputs; and deriving a statistical model in the form of an optimal combination function to determine at least one combined forecast value by combining weights assigned to the each of the one or more variants of the machine learning models trained based on the evaluating of the one or more variants of the machine learning models on the filtered historical dataset and the outputs of the each of the one or more variants of machine learning models trained on the historical dataset, wherein the selecting, the generating, the receiving, the correlating, the evaluating and the deriving are performed by a processor using computer-readable instructions stored in the memory.

2. The method of claim 1, wherein the machine learning models model the performance of the one or more predictive forecast models by comparing the respective forecasts values with the actual values over the historical dataset, or evaluating forecast errors of the one or more predictive forecast models over the historical dataset.

3. The method of claim 1, wherein the one or more predictive forecast models include a supervisory control and data acquisition (SCADA) model, a physical model including numerical weather prediction model, a statistical model, a machine learning model, an alternate forecast model, or combinations thereof.

4. The method of claim 1, wherein the one or more variants of the machine learning models include Artificial Neural Networks (ANNs), basis function models, kernel methods, support vector machines, decision trees, variation methods, distribution sampling methods, ensemble methods, graphical models, search methods, or combinations thereof.

5. The method of claim 1, wherein the one or more variants of the machine learning models are generated using ensemble techniques comprising bagging, boosting, AdaBoost, stack generalization, Bayesian model combination, clustering methods, tree based models, conditional mixture models, or combinations thereof.

6. A system for determining at least one combined forecast value of non-conventional energy resources for enabling adaptive forecasting of the non-conventional energy resources, the system comprising:

a processor;

an input/output (I/O) interface configured to read an adaptively selected historical dataset and a current dataset received from the one or more predictive forecast models and/or measurements, wherein the I/O interface is further configured to write the at least one combined forecast value; and a memory coupled to the processor, wherein the processor is capable of executing a plurality of modules and data stored in the memory, and wherein the plurality of modules comprises:

an adaptive forecast module configured for:

selecting a historical dataset comprising a first set of forecast values received from one or more predictive forecast models and a first set of actual values received from one or more measurements of the non-conventional energy resources;

generating one or more variants of machine learning models to model a performance of the one or more predictive forecast models by training the one or more variants of the machine learning models on the historical dataset;

receiving a current dataset comprising a second set of forecast values derived from the one or more predictive forecast models and a second set of actual values derived from the one or more measurements of the non-conventional energy resources;

correlating the current dataset with the historical dataset to adaptively obtain a filtered historical dataset;

selecting the one or more variants of the machine learning models trained on the historical dataset, and evaluating them on the filtered historical dataset to assign weights to each of the one or more variants of the machine learning models and their outputs; and deriving a statistical model in form of an optimal combination function to determine at least one combined forecast value by combining weights assigned to the each of the one or more variants of the machine learning models based on the evaluating of the one or more variants of the machine learning models trained on the historical dataset and the outputs of the each of the one or more variants of machine learning models trained on the historical dataset; and wherein the data comprises:

a predictive forecast database configured for storing the historical dataset and the current dataset;

a refined forecast database configured for storing the at least one combined forecast value.

7. The system of claim 6, wherein the one or more predictive forecast models include a supervisory control and data acquisition (SCADA) model, a physical model including a numerical weather prediction model, a statistical model, a machine learning model, an alternate forecast model, or combinations thereof.

8. The system of claim 6, wherein the one or more variants of the machine learning models include Artificial Neural Networks (ANNs), basis function models, kernel methods, support vector machines, decision trees, variation methods, distribution sampling methods, ensemble methods, graphical models, or combinations thereof.

9. The system of claim 6, wherein the one or more variants of the machine learning models are generated using ensemble techniques comprising bagging, boosting, AdaBoost, stack generalization, Bayesian model combination, clustering methods, tree based models, conditional mixture models, or combinations thereof.

\* \* \* \* \*

UNITED STATES PATENT AND TRADEMARK OFFICE
CERTIFICATE OF CORRECTION

| | | |
|---|---|---|
| PATENT NO. | : 9,269,056 B2 | |
| APPLICATION NO. | : 13/944532 | |
| DATED | : February 23, 2016 | |
| INVENTOR(S) | : Venkata Ramakrishna Padullaparthi et al. | |

It is certified that error appears in the above-identified patent and that said Letters Patent is hereby corrected as shown below:

Title Page, Item 72, the 1st inventor's information which reads:

"Venkata Ramakrishna Padullaparthi, Tamil Nadu (ID)" should read:

"Venkata Ramakrishna Padullaparthi, Tamil Nadu (IN)"

Signed and Sealed this
Tenth Day of May, 2016

Michelle K. Lee
*Director of the United States Patent and Trademark Office*